United States Patent [19]

Rose

[11] Patent Number: 4,640,992

[45] Date of Patent: Feb. 3, 1987

[54] SPEECH RESPONSE INTERFACE CIRCUIT

[75] Inventor: Richard C. Rose, Atlanta, Ga.

[73] Assignee: AT&T Information Systems Inc., Holmdel, N.J.

[21] Appl. No.: 649,271

[22] Filed: Sep. 10, 1984

[51] Int. Cl.[4] .................... H04M 3/50; H04M 11/00
[52] U.S. Cl. ..................................... 379/89; 370/61; 379/105
[58] Field of Search ............... 179/18 B, 5 P, 5 R, 179/27 FH, 2 DP; 370/61, 62, 67

[56] References Cited

U.S. PATENT DOCUMENTS

| 4,385,359 | 5/1983 | Watari et al. | 364/513 |
|---|---|---|---|
| 4,389,720 | 6/1983 | Baxter et al. | 370/62 |
| 4,446,337 | 5/1984 | Cofer | 179/18 B |
| 4,523,055 | 6/1985 | Hohl et al. | 179/2 DP |
| 4,554,418 | 11/1985 | Toy | 179/2 DP |

FOREIGN PATENT DOCUMENTS 3221686 12/1983 Fed. Rep. of Germany ........ 179/27 FH

OTHER PUBLICATIONS

"The Digital Recorded Announcement Module, A New Voice for DMS-100", C. Champagne et al., *Telests* (Canada), one, 1983, pp. 23-29.
"Gaston Telephone Answering System and Solid-State Announcement Machine", R. Tanguy et al, *Commutation & Transmission* (France), No. 2, 1983, pp. 67-80.
International Conference of Acoustic Speech Signal Processing, Paris, 1981, B. S. Atal & J. R. Remde, "A New Model of LPC Excitation".

Primary Examiner—Thomas W. Brown
Attorney, Agent, or Firm—D. H. Tannenbaum

[57] ABSTRACT

There is disclosed a speech interface circuit for use with a communication bus to interface telephone users with a computer which is also connected to the communication bus. The circuit operates to accept digital input signals over the bus from the communication processor as well as from the user and to translate these signals for the benefit of the computer. Under control of computer instructions interpreted from the translated signals, the interface transmits selected prestored speech messages to calling users.

31 Claims, 8 Drawing Figures

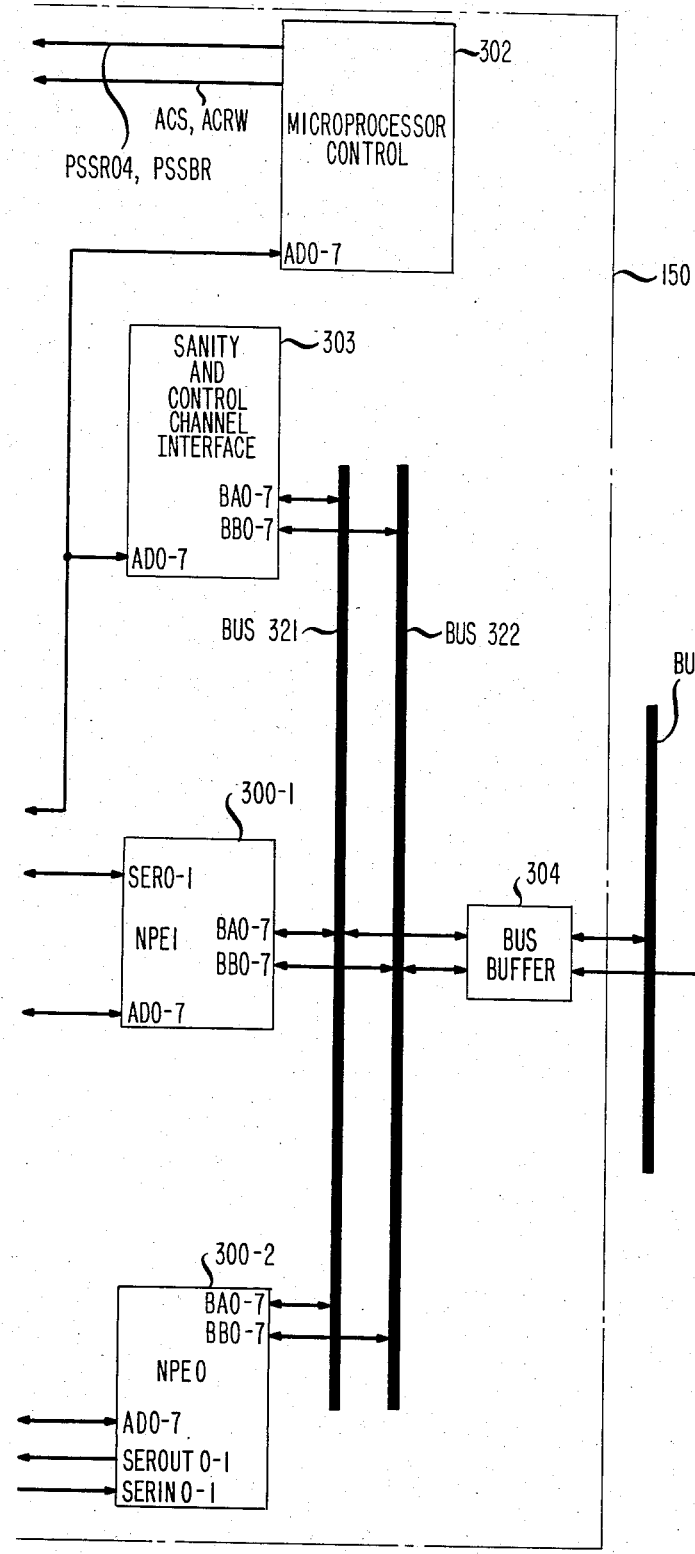

FIG. 7
DATA CHANNEL MESSAGE SET
HOST COMMANDS

| | |
|---|---|
| TALK | -SPEAK THE FOLLOWING WORDS OR PAUSES ON PORT n |
| WORD | -SPEAK WORD OR PHASE NUMBER nnn |
| PAUSE | -nnn TENTHS OF A SECOND SILENCE |
| KILL | -EMPTY PORT n's VOICE QUEUE |
| ANSWER | -GO OFF HOOK ON LINE n |
| HANGUP | -GO ON HOOK ON LINE n |
| FORWARD | -FORWARD CALL ON LINE n |
| DIAL | -DIAL DIGITS nnnn |
| LOAD | -LOAD SPEECH IN SPEECH FILE m |
| SANE | -SANITY POLL FOR SSB |

VIC RESPONSES

| | |
|---|---|
| RINGING | -PORT n IS IN THE RINGING STATE |
| DIGITS | -TTR DIGIT m RECEIVED ON PORT n |
| NOTIFY | -SPEECH IS DONE ON PORT n |
| TIMEOUT | -INTERDIGIT TIMEOUT ELAPSED ON PORT n |
| ERROR | -BOARD ERROR CONDITION NUMBER nn |
| RESP | -RESPONSE TO POLL MESSAGE FROM HOST |

FIG. 8
CONTROLLER-PSS MESSAGES

| | | |
|---|---|---|
| LDSTA | -LOAD START ADDRESS | 1FFFssss |
| | | ssssssss |
| | | ssssssss |
| STOP | -KILL SPEECH | 0110xFFF |
| TSTMEM | -TEST MEMORY | 0010ssss |
| | | ssssssss |
| | | ssssssss |
| | | bbbbbbbb |
| | | bbbbbbbb |
| WRMEM | -WRITE MEMORY | 0011ssss |
| | | ssssssss |
| | | ssssssss |
| | | bbbbbbbb |
| | | bbbbbbbb |
| RDMEM | -READ MEMORY | 0100ssss |
| | | ssssssss |
| | | ssssssss |
| | | bbbbbbbb |
| | | bbbbbbbb |
| RDSTAT | -READ STATUS | 0101xwww | fff: SPEECH SYNTHESIZER FIFO NUMBER
ss......ss: START ADDRESS
bb......bb: NUMBER OF BYTES
www: STATUS WORD NUMBER

SPEECH RESPONSE INTERFACE CIRCUIT

BACKGROUND OF THE INVENTION

This invention relates to an interface circuit and more particularly to such a circuit adapted to provide speech outputs in response to digital stimuli.

It is often necessary for a telephone communication system to interface with automatic equipment for the provision of a service. For example, many buildings are now being controlled by computerized equipment and building users must sometimes report troubles, or provide information, to the control system over the PBX telephone system.

A problem exists in that the user, in order to communicate digitally with the system, must remember or look up a long list of number codes, each representing a different function to be performed by the system. While this may not present a great problem for routine requests from those who commonly use the system, it does, however, cause some users difficulty because they either do not remember or never had access to the list of codes.

The problem is compounded when the system response is tailored to a fluctuating set of circumstances. Thus, when the dialing of a particular digit code, say five, performs different functions depending upon some past action, the user can become easily confused.

As an answer to the problem, a system could be arranged to use a speech synthesizer interface to provide voice answerback capability in response to the transmittal of digital signals from a system user. Thus a user, operating from a telephone station, dials certain digits and the interface circuit provides voice instructions coaching the user as to which numbered buttons should be operated to achieve the desired result.

The straightforward manner of arranging such a system is to have the voice response limited only to the stimulus provided by the user. Thus, every response to a certain stimulus would always be identical. This is not acceptable when the response must be tailored to a combination of events or when the response is computer controlled. Accordingly, a need exists in the art for a voice answer circuit arranged to return to the user responses which are derived from an interaction of several independent input stimuli.

This need is motivated by those PBX customers who would like to provide access to data processing facilities or data services resources to a large number of users who do not have access to expensive data terminal equipment.

There are a wide variety of tasks relating to information retrieval, order entry and command/response whose implementation are unique to a specific customer. However, typically, the PBX manufacturer is not equipped to provide each customer with the necessary application software for every possible customer usage. On the other hand, the customer generally does not have the expertise to provide these applications because their implementation entails modifying software that provides the stored program control of the PBX. The dilemma then is that the owner of the PBX, who is the most intimately familiar with how features designed for his business should be implemented, does not have the expertise or knowledge to effect the necessary changes.

This invention addresses the issues of customer programmability of PBX services and the use of a standard telephone station set as a data terminal device. The device has a port circuit appearance in the system architecture and can send and receive data over the common bus described below. As with other port circuits, it receives control information over the bus from the call processor through a special message set. Rudimentary functions like call set up and maintenance are performed by the call processor. However, control of applications tasks such as playing speech and interpreting incoming dual tone multifrequency digits from the station set can be performed either by the call processor or some other data processing equipment supplied by the customer.

SUMMARY OF THE INVENTION

I have designed a speech response interface circuit which stores and synthesizes speech and receives digital signals in the form of multifrequency tones from the user over a time division (TDM) bus. The speech response interface circuit enables multiple point user access to a data inquiry voice answer service from any port circuit connected to the common bus equipment. Thus, the user controls the speech access to the service while the stored program of the communication system controls the call handling procedure. The PBX owner can exercise high level control over the speech response system from any data terminal or computer which is interfaced to a data module connected to the system.

The interface has a standard port circuit appearance featuring distributed stored program control over functions that are common to all port circuits. These functions include call setup, port circuit level maintenance and network interface. Control for these functions originates at a central control point in the communication system and transmitted to and from the port circuits via a message set.

The interface circuit has centralized access afforded by the TDM bus architecture, as well as multiple point control made possible by its ability to terminate both the control channel message set and a data communications protocol.

This arrangement allows the interface circuit to receive and prestore specific message sets from a host computer and to subsequently respond to signals sent by the host computer by sending a particular stored message to a system user. In operation, a user would transmit a MF tone and the interface circuit would forward the translated value of this tone to the host computer. The host computer would then instruct the interface circuit as to which message to transmit to the user. Such a message could be, for example, "to report a fire, press button 5". Upon receipt of the MF tones corresponding to a "5", the interface circuit would forward a corresponding signal to the host computer which then could instruct the interface to respond with the message "A fire has been reported. Please enter location by pressing the digit corresponding to floor number. Please close all doors and leave the building. Do not use the elevators." In addition, messages pertaining to call status can be passed between the Voice Interface Circuit (VIC) and customer's host computer. These messages include, for example, the report of an incoming call by the VIC to the host or a command from the host to the VIC instructing it to terminate an existing call.

BRIEF DESCRIPTION OF THE DRAWINGS

These and other objects and features, together with the operation and utilization of the present invention, will be more apparent from the illustrative embodiment shown in conjunction with the drawing in which FIGS. 3, 4 and 5 are schematic diagrams of the voice interface port, FIG. 6 shows how FIGS. 3, 4 and 5 are combined, FIG. 7 is a chart of interface host computer messages, and FIG. 8 is a chart showing a possible message set used within the voice interface port.

GENERAL DESCRIPTION—OVERALL SYSTEM

Figure 1:
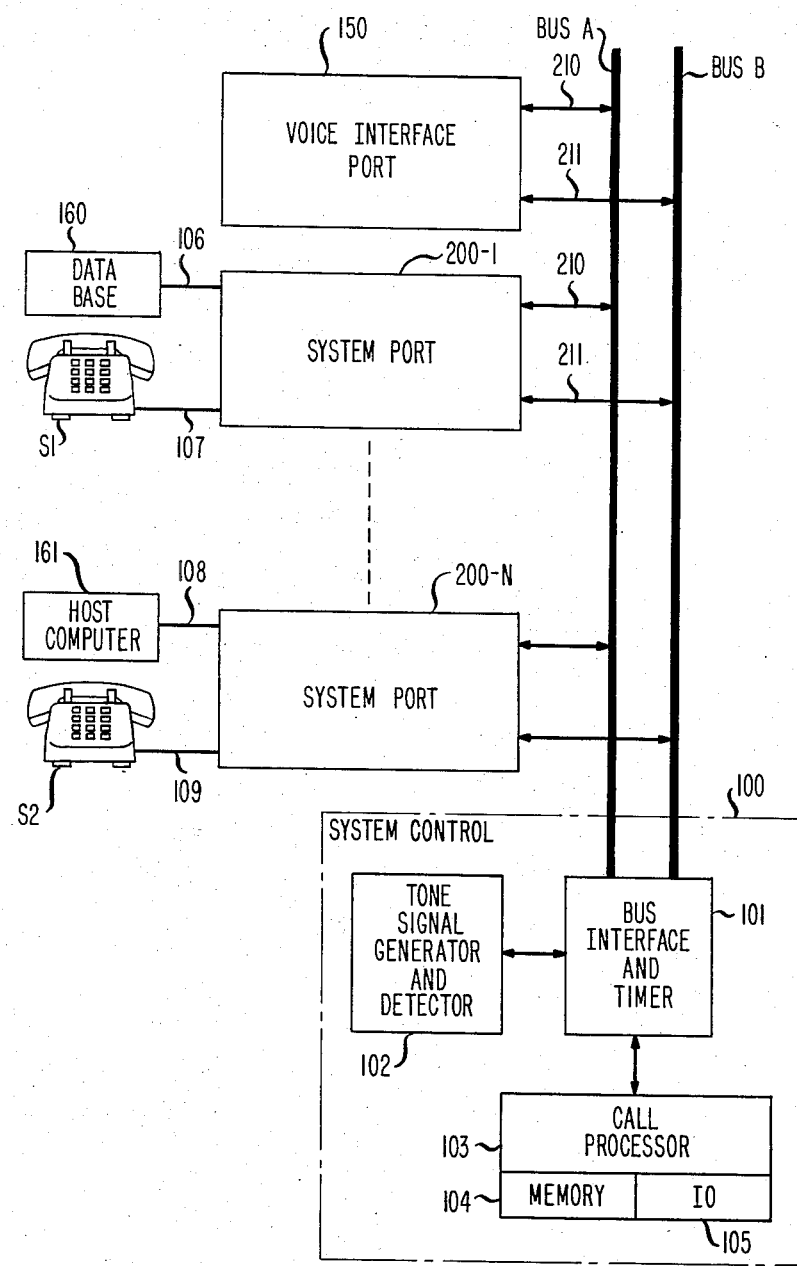
FIG. 1 is a broad block diagram showing a communication system having voice answer capability.

FIG. 1 illustrates a communication system in which control is distributed among the system ports 200-1 to 200-N. Each such port of the system serves a number of terminals, such as station S1. Serving the system ports there is shown a dual bus digital system, having Bus A and Bus B, with common system control 100. The system control has bus interface and timer 101, call processor 103 and tone source signal detector 102. The call processor operates to take in stimuli from the stations via the ports and to control station interconnection by establishing the time slots which are to be used for each station.

Processor 103 provides control information to the system ports indicative of the identity of the time slots which must be combined for a given connection. The control section also includes tone signal generator and detector 102 for generating and detecting call progress tones. The system shown handles voice signals, as well as data, between the various stations. The system shown is only one example of the type of system which could utilize my invention and more details of such a system is found in U.S. Pat. No. 4,389,720, issued to L. A. Baxter on June 21, 1983, which patent is hereby incorporated by reference herein.

Figure 2:
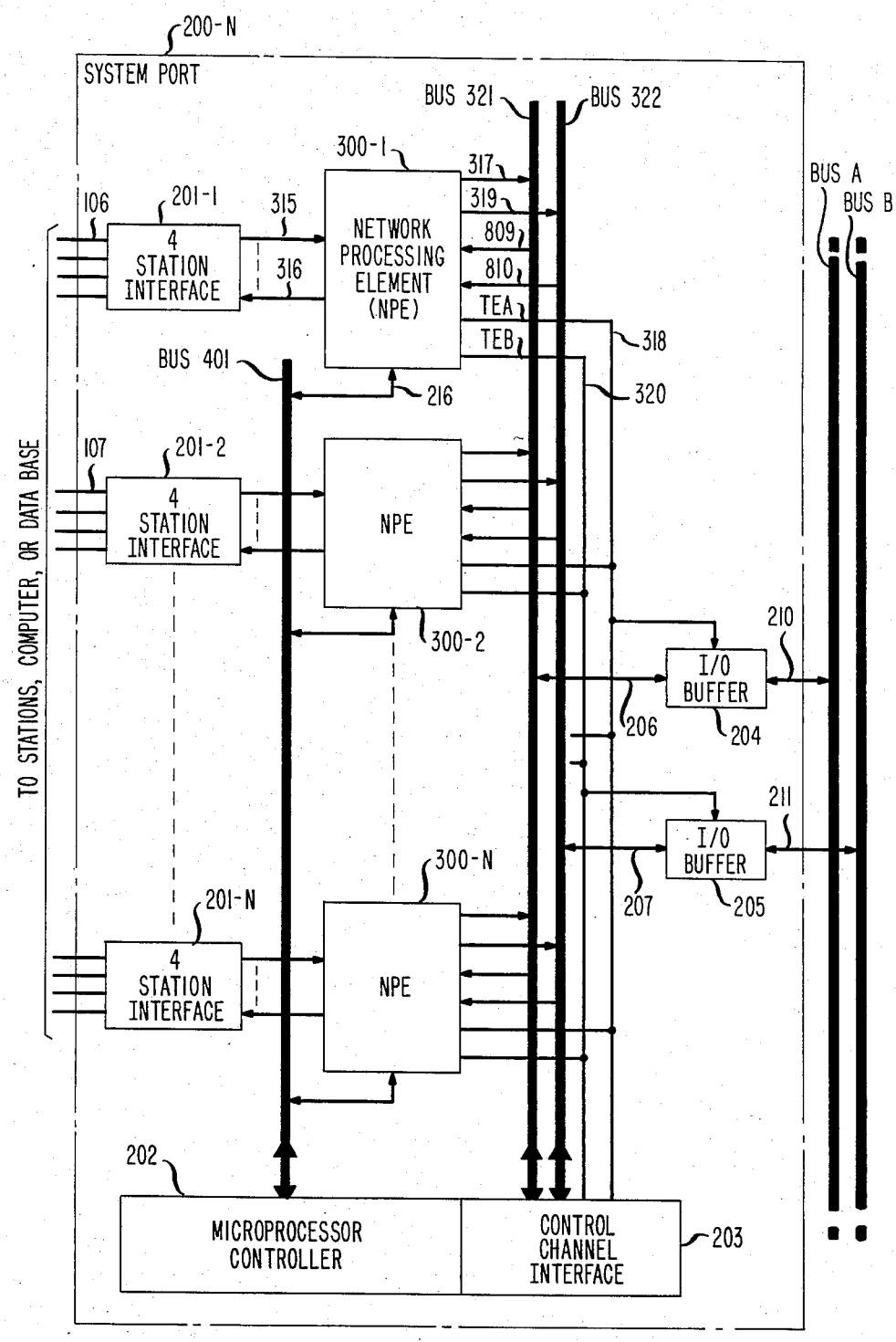
FIG. 2 is a block diagram showing the arrangement of a system port.

The system port shown in FIG. 1 has been expanded in FIG. 2 to show the circuit elements. I/O buffers (204, 205) which interface the port circuits to buses A and B. The Network Processing Elements 300 (NPE), of which only three are shown, process and control the signals between the stations and the buffered buses 321, 322. The NPEs transmit signals from each of the stations onto either of the two buses and receive signals for each station from either bus.

Each network processing element as shown is capable of handling data to or from four stations. Station interface circuits 201 contain either codecs or digital station formatting circuits to send or receive samples from a station. Each station interface circuit operates to properly format the samples coming to and from a digital station and operates to convert between analog and digital transmission for an analog station.

Line 106 handles bidirectional communications with data base 160 (FIG. 1), while line 107 is associated with station S1 (FIG. 1).

In FIG. 2 there is shown microprocessor controller 202 and control channel interface 203. Microprocessor controller 202 assigns transmit and receive time slots to each of the NPEs over bus 401. Control channel interface 203 allows microprocessor 202 to communicate over either bus 321 or bus 322 via bus A or bus B to call processor 103 via bus interface 101 (FIG. 1).

There are two buses designed into the illustrated system to double the capacity of the system. Each bus runs at a 2.048 MHz sample rate allowing 256 time slots per bus.

I/O buffers 204 and 205 operate in either direction and are under control of the NPEs or control channel interface 203. Each of the buffers normally receives samples from the bus during all time slots, but, when any particular NPE requires a transmission on a particular time slot, that NPE will force the buffer to transmit while simultaneously outputting its data to the corresponding bus (321 or 322). The NPE will signal the buffer via the TEA (or TEB) line causing the corresponding buffer to transmit the data on bus 321 (322) onto the system bus A (B).

A call is established in the system by call processor control 103 (FIG. 1) as a result of a stimulus from a station or data base over a line, such as line 106. This stimulus is received by microprocessor controller 202 (FIG. 2) which sends a stimulus signal through control channel interface 203 over either bus A or bus B to call processor 103 (FIG. 1). The call processor establishes which time slots are to be used for the call and sends a response signal back over either bus A or bus B to control channel interface 203 of the ports involved. The microprocessor controller at those ports then programs the NPEs to transmit and receive on specified time slots for the duration of the call.

DETAILED DESCRIPTION

Voice Interface Port

Voice interface port 150, FIG. 1, is connected to bus A and bus B in similar manner as is system port 200. Voice interface port 150 functions with respect to the TDM bus using time slots in the same manner as the general system ports. The main difference between a system port and the voice interface port is that the voice interface connects only with the TDM bus and not with individual stations and, therefore, does not require codecs or digital station formating circuits to send or receive samples from a station. As will be seen, the voice interface port handles information over the TDM bus in one or more assigned time slots.

The purpose of the voice interface port is to provide several stored announcement channels over the TDM bus. A voice message is encoded using any speech encoding algorithm, such as the Multipulsed LPC algorithm (MPLPC), as defined in the proceedings of the International Conference of Acoustic Speech Signal Processing, Paris, 1982, B. S. Atal and J. R. Remde, "*A New Model of LPC Excitation.*", and is stored in a Read Only Memory or Random Access Memory, if the PBX customer is to have the ability to effect changes to the message. The encoded speech parameters are read from the memory into speech synthesis devices that decode the parameters, and produce 64 Kbit per second $\mu$ law PCM speech. Speech is loaded into the RAM over a asynchronous data channel from the customer's own data base or from the call processor. Four multifrequency receiver channels connect to the TDM bus to detect the presence of the user-dialed multifrequency digits. These detected digits are passed on to either the PBX customer's host or to the system call processor depending upon proprogramming of the voice interference port.

Customer Control of Voice Response Services

When it is desired to use the Voice Interface Circuit (VIC) in an application where control is provided by the PBX customer's host computer, connectivity must be established between the VIC and the host computer over the TDM bus.

This connectivity is necessary so that the state of on-going calls can be reported to the host by the VIC, and the host can exert control over the operation of the VIC. A typical message set exchanged between the host and the VIC is shown in FIG. 7.

When a connection between host computer and VIC is desired, two time slots are allocated by call processor 103 (FIG. 1). As with a voice call, microprocessor controller 302 (FIG. 5) receives stimulus from the system call processor through the control channel interface informing it of an incoming call. After the time slots have been assigned, two data modules begin a handshake procedure which involves the sending and receiving of information by the two data modules that can be examined to determine if the two data modules are compatible. This compatibility is in the sense of like data rates and transmission formats such that data will be transmitted and received correctly. A successful handshake results in the data call being completed, while a failed handshake results in the call being disconnected by the call processor.

The data processing equipment communicates with the speech response interface circuit by means of a simple message set (FIG. 7), different from that of the control channel message set, but still interpreted by microprocessor controller 302.

There are two different types of stimuli that can be transmitted and received over this channel. That level of control that involves the operation of the circuit once a voice call has been connected and that level of control allowing the remote data processing equipment to perform call setup and control functions. This interaction can be illustrated by the following sequence of events. It is assumed that the call between the remote data processing equipment (host) and the voice interface circuit has been completed. A call from a voice station set to the voice interface circuit is connected by the normal means, except the station set connected to the port circuit over a line is replaced by the host computer. The VIC informs the host of a ringing condition and the host instructs the VIC to relay an "off hook" condition to the call processor over the control channel. The host can then instruct the VIC to transmit a series of stored speech phrases over the TDM bus by referring symbolically to the phrases to be generated. MF digits that are generated by the remote voice station set are received and decoded by circuitry on the VIC, then they are parameterized and transmitted to the host.

Note that both the generation of speech and the reception of MF digits is done independently of the call processor. The call processor is still responsible for rudimentary call setup and control procedures, but the details of the application are left to the host computer. Once the interaction between voice station set and host has run to completion, the host may generate an "on hook" stimulus that will be passed along by the VIC to the call processor.

In addition to the host commands and reponses discussed above by way of example, the host can enact the following: the parameters representing compressed speech can be downloaded from the host to the VIC. The host can send stimulus to the VIC to poll the circuit pack for sane operation. The VIC can respond to the poll indicating status.

Figure 3:
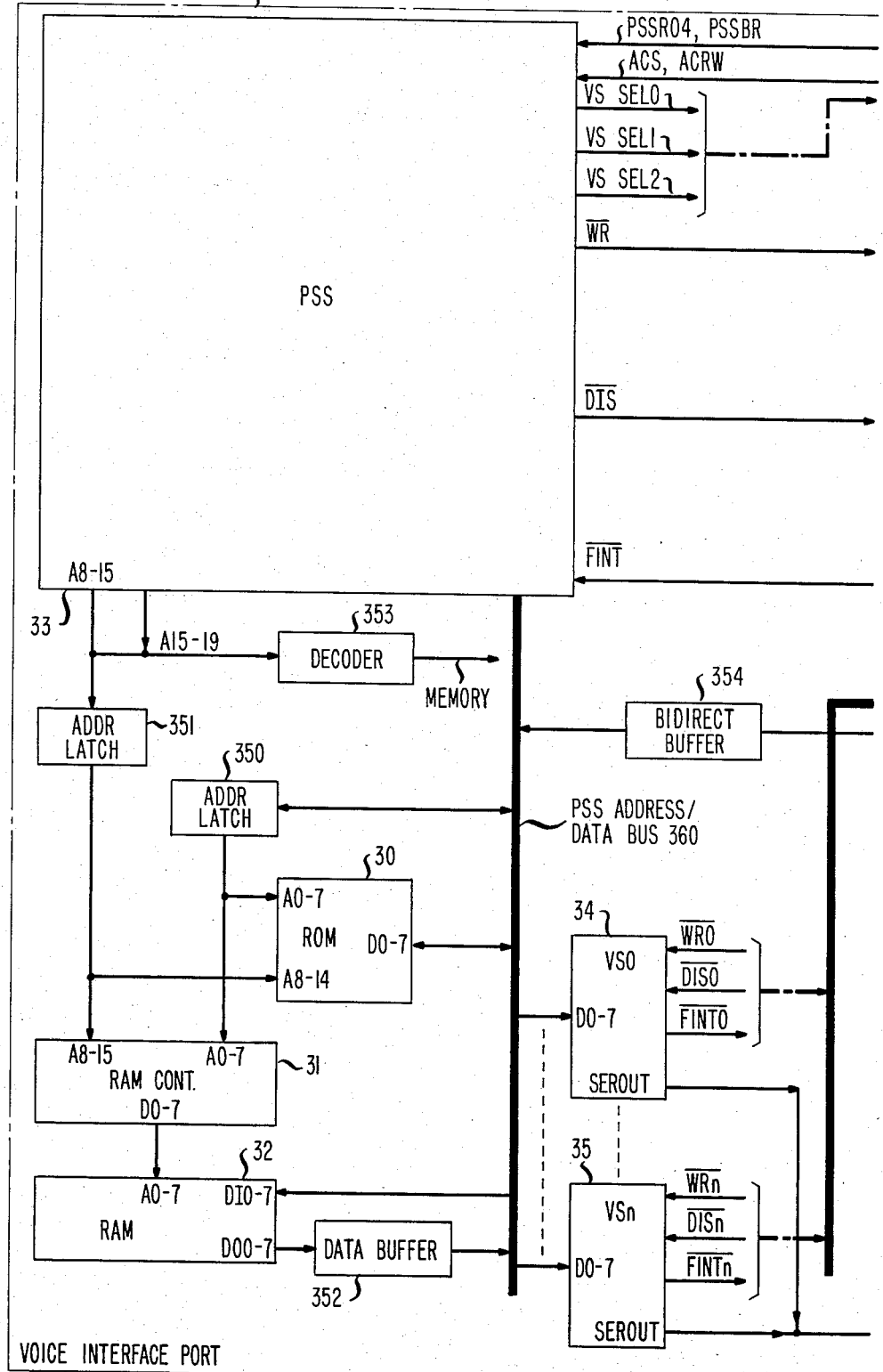

As shown in FIG. 3, the VIC has enough memory capacity to hold 512k bytes of compressed speech in RAM 32 and ROM 30. The multiple pulse excited linear predictive coding scheme requires approximately 9600 bits of memory per second of speech, which corresponds roughly to 850 words in the available memory space. Half of this memory is nonvolatile ROM 30 which allows for a permanently resident vocabulary or stored set of speech phrases. The other half is RAM 32 that can be used to hold data representing compressed speech that is downloaded from either the call processor or any remote data processing equipment as discussed previously. Various directories exist within the speech data to relate the parameterization of a speech phrase to the actual location of the corresponding parameters in the vocabulary memory.

Figure 4:
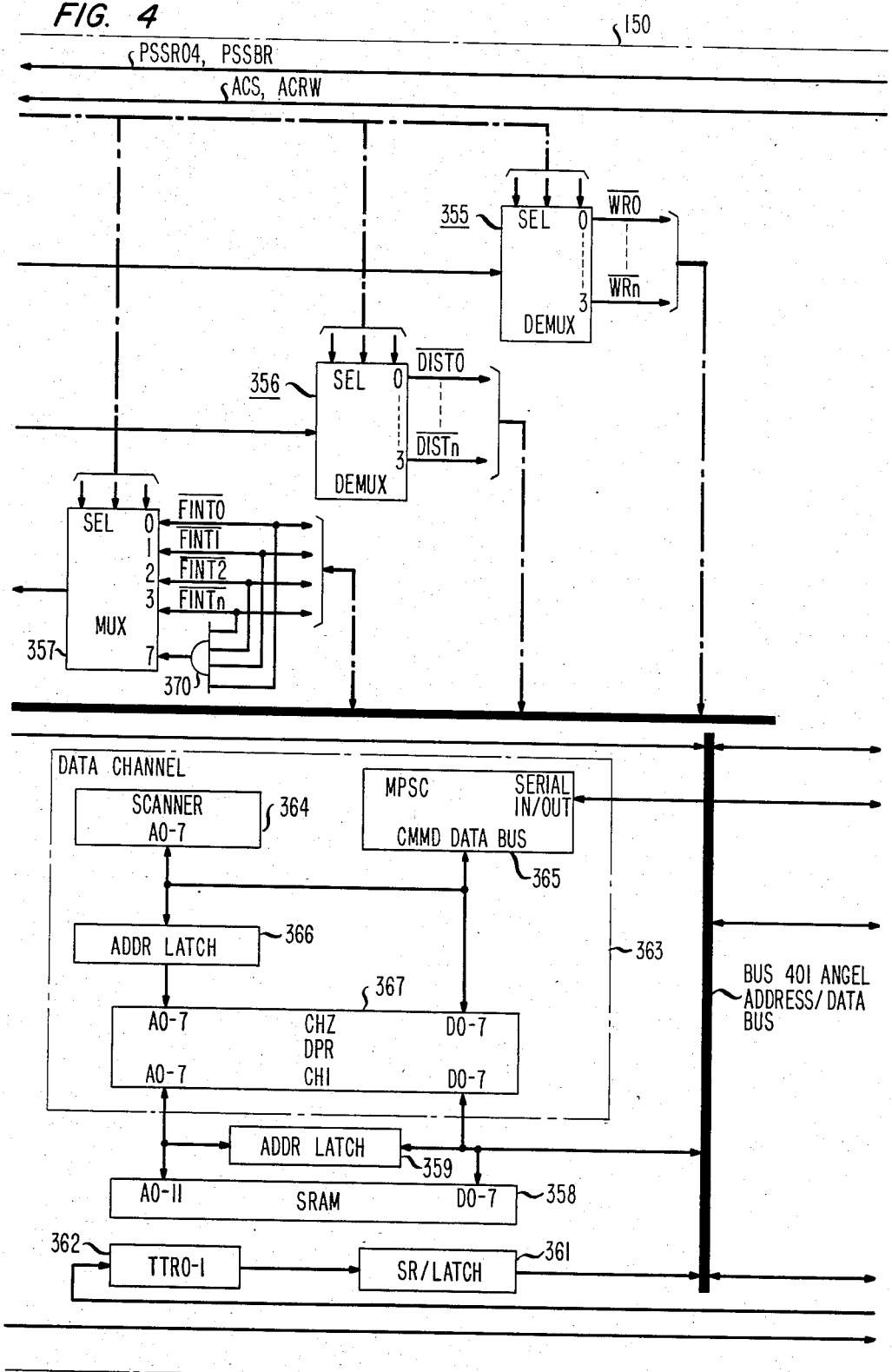

Speech parameter data is downloaded by the following sequence of events, as shown with reference to FIGS. 3, 4 and 5. A data call is connected as described previously such that the microprocessor controller 302 communicates with the remote data processing equipment by means of the message set shown in FIG. 7 and discussed above. Downloading is initiated by an instruction from the remote data processing equipment. Microprocessor controller 302 cannot directly access the vocabulary memory; therefore, it must instruct programmable speech synthesizer (PSS) 33 to write a block of speech data into the vocabulary memory by means of bidirectional buffer 354 between microprocessor controller 302 and PSS 33. The instructions are in the form of the "controller" PSS messages as shown in FIG. 8.

An instruction is passed to PSS 33 instructing it to write a designated number of bytes into the vocabulary memory beginning at a designated memory location. The speech parameters are then passed as data.

Once a voice call has been connected, the VIC can receive instructions over data channel 363 (FIG. 4) or over control channel bus A (bus B) for synthesizing speech over one of the ports VSO, VNn on the VIC circuit.

Microprocessor controller 302 receives instructions from the host computer that include a data field indicating which speech phrase is to be generated. Microprocessor controller 302 contains a buffer for each of the speech synthesis ports that is used to store the succession of data fields corresponding to speech phrases to be spoken over that port.

The status of each speech synthesis port can be determined by the microprocessor controller 302 by writing a status inquiry (FIG. 8) to bidirectional buffer 354. PSS 33 responds with the appropriate status inquiry response message indicating whether the port is idle, busy or somehow at fault. When there are many speech phrases to be synthesized on a given port, microprocessor controller 302 continually checks the status of that port to determine if another instruction can be issued to PSS 33 to begin synthesizing another speech phrase.

The programmable speech synthesizer circuit (PSS 33) is controlled by a microcomputer such as an Intel 8051 microcomputer, and receives instructions from and passes status to microprocessor controller 302. Speech vocabulary is stored in ROM 30 and RAM 32 all within PSS 33's address space. RAM controller 31 serves to decode memory addresses from PSS 33 and provides timing and refresh logic for RAM 32.

There are several speech synthesis channels numbered 0-n that receive data over the PSS 33's data bus 360 and which transmit speech through VSO 34 and VSn 35 and NPEO 300-2 onto the TDM bus. VSO 34 and VSn 35 are digital signal processors which, under program control, receive linear predictive coded speech and outputs 64 Kbit PCM speech.

Two MF receiver devices 362, each supporting two digital MF receiver channels, are connected to the TDM bus via NPEO 300-2. Both devices shift data out into a shift register latch 361 that is readable by microprocessor controller 302.

An asynchronous data channel 363 is terminated on the interface port. Serial controller 365, which can be an UP7201 multiprotocol serial controller (MPSC), receives and transmits serial data through the NPE1 300-1 over the TDM bus. Within data channel 363 scanner 364, which can be an Intel 8051 microcomputer transfers data and control information to and from serial controller 365. Scanner 364 and microprocessor controller 302 communicate with each other through dual port ram device 367, allowing access to common internal memory without contention overhead. An alternative to the dual port RAM would be a RAM with an arbitration arrangement to control access as between the scanner and the controller.

The MF receiver channels on circuit 362 multiplex two NPE serial output channels (SEROUT 0-1) into their serial input channels. This allows both serial data channels to be shifted into TR0-1 in a single 125 microsecond sample period.

The MF receivers shift out a byte through their serial ports when any of the following conditions occurs. A digit has been detected, an early detect condition has occurred, or a port enters the no digit state. In any of these situations, the receiver 362 interrupts controller 302 whenever a byte is shifted out. Shift register latch 361 receives serial input and transfers that input to controller 302 under control of an enable signal from the controller. The enable signal is initiated by an interrupt signal from TTRO-1 362.

The programmable speech synthesizer (PSS) circuit 33 is a microprocessor, such as an Intel 8051 microprocessor. PSS 33 communicates with controller 302 through a bidirectional buffer 354.

There are four IO lines that are common to PSS 33 and controller 302, namely, ACS which interrupts and selects PSS 33; ACRW which serves as a Read/Write control line to the PSS 33; PSSRDY which is an acknowledgment from PSS 33; and PSSBR which indicates that the PSS 33 is accessing external memory.

All transfers between controller 302 and PSS 33 are initiated by the controller. When controller 302 desires to communicate with PSS 33, it checks the PSSBR line to see if the PSS 33 is involved in an external access. When the controller determines that this line is not asserted, line ACS is asserted. When controller 302 is performing a write to the PSS 33, line ACRW is asserted and controller 302 places the data to be written on its address data lines. PSS 33 informs controller 302 that the data has been read by deactivating line PSSRDY. When controller 302 is performing a read from PSS 33, controller 302 simply executes a standard read machine cycle once PSS 33 has asserted line PSSRDY.

Each speech synthesis device 34,35 consists of an 64×8 input FIFO with an 8 bit parallel input port, a speech processor and a 64×8 output FIFO with a serial output.

PSS 33 Control

PSS 33 has one input FINT and two outputs WR and DIS that are used for control of the speech synthesis devices. There are also three select lines (VS SEL 0,1,2) that are used by PSS 33 to select the synthesizer device VSO-VSn that is being serviced.

Lead FINT reflects the state of the half full flag of the input FIFO of the speech synthesis devices VSO-VSn. This lead is multiplexed through MUX 357 from devices VSO-VSn.

Lead FDIS disables the half full flag interrupt output of the speech synthesis device. This lead is demultiplexed through DEMUX 356 and goes to the DIS input of each speech synthesis device. Lead WR is the write enable lead and is demultiplexed through DEMUX 355 and goes to the WR inputs of the speech synthesis device.

Select leads SEL0-SEL2 serve as select lines to the output demultiplexers 355,356 and input multiplexer 357. When a synthesis port is not being serviced, these lines remain high. All four half full interrupt lines FINT are AND'd by gate 370 and appear at the FINT input to PSS 33 so long as leads SEL0-SEL2 are all high.

PSS 33 receives instructions through bidirectional buffer 354 from controller 302 to begin synthesizing speech over one of the ports. As a result of this instruction, PSS 33 reads the first 64 bytes of speech data from the vocabulary memory into the input FIFO of the speech synthesis device for that port. The speech synthesis device will immediately begin synthesizing speech. After 32 bytes have been read by the device from the input FIFO, the half full interrupt of that device will go low, and interrupt PSS 33. PSS 33 responds by selecting the synthesizer control lines using SEL0-SEL2. The DIS output of PSS 33 is then brought low, clearing the half full interrupt output from the active speech synthesis device. The controller then writes 32 additional bytes into the input FIFO of the selected voice synthesis device. This continues until the end of the speech data is reached. When the internal speech processor of the selected voice synthesis device finds the FIFO empty, it will stop shifting data into the output FIFO, and wait on further data being loaded into the input FIFO.

Dynamic RAM Interface

RAM 31 is a dynamic RAM controller, such as National DP8409-2 Multi-Mode Dynamic RAM, Controller, (IC37) and is used to provide a dynamic RAM interface to PSS 33, allowing the dynamic RAM array 32 to appear as static memory. Timing logic is included so that the PSS 33 can access the RAM without delays due to refresh and address multiplexing.

Loading Message Sets from Host Computer

When controller 302 detects a load message code in DPR 367, it acts to transfer the data message, which is received over the TDM bus and stored in DPR 367, to PSS 33 via bidirectional buffer 354. Controller 302 adds special headers to the message set so that PSS 33 can correctly process the message set. These headers are shown in FIG. 8. PSS 33 thereupon stores the message in RAM 32. The message arrives from the host computer in linear predictive coding format.

Conclusion

While a specific embodiment has been discussed, it would be obvious for one skilled in the art to extrapolate from my teaching without departing from the spirit or scope of my invention.

Several alternative embodiments come immediately to mind. Instead of the interface circuit receiving speech data for loading into the RAM from only the communication processor or from only the host computer, it could accept such data from both selectively. Such a situation would be helpful, for example, when a new feature is added on a system wide basis. Also, it should be noted that the interface will work with only the central processor and does not require the host computer.

A TDM bus structure is shown, but any type of network can be configured to work; and, if one were willing to convert the speech signals to other formats, such an analogy would work with compatible networks.

The link between the host computer and the interface is contemplated as being permanent, but such need not be the situation and this link could be established only when necessary.

What is claimed is:

1. A voice response circuit for use in a communications system having a plurality of terminals interconnected for communications purposes by a common network controlled from a communication processor, said voice response circuit comprising
    means for storing digitized voice messages received over said network from a first specific one of said terminals communicating over said network,
    means controlled jointly by said communication processor and a second specific terminal for establishing communication connections to said network so as to receive control data from others of said terminals communicating over said network,
    means responsive to receipt of said control data from a specific other one of said other terminals for transmitting representations of said received control data to said second specific terminal, and
    means responsive to receipt of instructional data from said second specific terminal for communicating a particular one of said stored voice messages to said specific other terminal over said network.

2. The invention set forth in claim 1 wherein said voice response circuit further comprises
    means responsive to particular instructional data from said second specific terminal for sending a message to said communication processor so as to terminate said established communication connections.

3. The invention set forth in claim 2 wherein said storing means includes a local processor for controlling data flow to and from said voice response circuit,
    a RAM
    means for buffering compressed digitized speech data comprising said voice messages, and
    means controlled by said local processor for transferring data buffered by said last-mentioned means to said RAM.

4. The invention set forth in claim 3 wherein said instructional data responsive means includes
    means for retrieving said compressed data which comprises said particular one of said stored messages from said RAM and for converting said retrieved message to an expanded version of said digitized message prior to communicating said message to said second specific other terminal.

5. The invention set forth in claim 1 wherein said second specific terminal is a host computer communicating with said voice response circuit over a communication connection through said network established under joint control of said host computer and said communication processor.

6. The invention set forth in claim 5 wherein said other terminals include voice telephones.

7. The invention set forth in claim 1 wherein said voice response circuit further comprises
    means responsive to receipt of interconnection signals from said communication processor for transmitting representations of said interconnection signals to said second specific terminal.

8. The invention set forth in claim 1 wherein said voice response circuit further comprises
    means responsive to receipt of certain instructional data from said second specific terminal for communicating interconnection signals to said communication processor.

9. The invention set forth in claim 1 wherein said voice response circuit further includes a ROM for permanently storing said digitized voice messages.

10. A voice response circuit for use in a communications system having a plurality of terminals interconnected for communications purposes by a common network controlled from a communication processor, said voice response circuit comprising
    means for storing digitized voice messages received over said network from a specific first one of said terminals communicating over said network,
    means controlled by said communication processor for establishing a communication connection to said network so as to receive control data from said terminals communicating over said network,
    means responsive to receipt of said control data from a specific second one of said terminals for transmitting representations of said received control data to said communication processor, and
    means responsive to receipt of instructional data from said communication processor for communicating a particular one of said stored voice messages to said second specific terminal over said network.

11. The invention set forth in claim 10 wherein said storing means includes a local processor for controlling data flow to and from said voice response circuit,
    a RAM
    means for buffering compressed digitized speech data comprising said voice messages, and
    means controlled by said local processor for transferring data buffered by said last-mentioned means to said RAM.

12. The invention set forth in claim 11 wherein said instructional data responsive means includes
    means for retrieving said compressed data which comprises said particular one of said stored messages from said RAM and for converting said retrieved message to an expanded digitized version of said message prior to communicating said message to said second specific other terminal.

13. The invention set forth in claim 12 wherein said voice response circuit further includes a ROM for permanently storing digitized voice messages.

14. A voice response circuit for use in a communications system having a plurality of terminals interconnected for communications purposes by a common network controlled from a communication processor, said voice response circuit comprising means for permanently storing digitized voice messages, means controlled jointly by said communication processor and a first specific terminal for establishing a communication connection to said network so as to receive control data from others of said terminals communicating over said network, means responsive to receipt of said control data from a specific one of said other terminals for transmitting representations of said received control data to said first specific terminal, and means responsive to receipt of instructional data from said first specific terminal for communicating a particular one of said stored voice messages to said specific other terminal over said network.

15. The invention set forth in claim 14 wherein said voice response circuit further comprises means response to particular instructional data from said first specific terminal for sending a message to said communication processor so as to terminate said established communication connection.

16. The invention set forth in claim 14 wherein said voice response circuit further comprises means responsive to receipt of interconnection signals from said communication processor for transmitting representations of said interconnection signals to said first specific terminal.

17. The invention set forth in claim 14 wherein said voice response circuit further comprises means responsive to receipt of certain instructional data from said first specific terminal for communicating interconnection signals to said communication processor.

18. The invention set forth in claim 14 wherein said voice response circuit further comprises means for storing digitized voice messages received over said network from certain ones of said terminals communicating over said network.

19. The invention set forth in claim 14 wherein said storing means includes a local processor for controlling data flow to and from said voice response circuit, a RAM means for buffering compressed speech data comprising said voice messages, and means controlled by said local processor for transferring data buffered by said last-mentioned means to said RAM.

20. The invention set forth in claim 19 wherein said instructional data responsive means includes means for retrieving said compressed data which comprises said particular one of said stored messages from said RAM and for converting said retrieved message to an expanded version of said digitized message prior to communicating said message to said specific other terminal.

21. The invention set forth in claim 14 wherein said voice response circuit comprises means for storing voice messages received over said network from said communication processor.

22. A system for communicating between terminals and a data processing system over a communication network controlled by a communication processor, wherein communication connections between said data processing system and said terminals are controlled in part by said communication processor, said system comprising an interface circuit connected to said network, means for establishing a bidirectional communication connection between said network and a calling one of said terminals, means for establishing a bidirectional communication connection between said network and said data processing system, means, including said interface circuit, responsive to communication connection establishing signals from said communication processor for translating said signals into messages for delivery via said network to said data processing system over an established communication connection, and means responsive to messages received from said data processing system for sending communication connection establishing signals to said communication processor so as to control said terminal communication connection establishing means.

23. The invention set forth in claim 22 wherein said interface circuit further comprises, means for storing data, and means controlled by messages received from said data processing system for sending selected portions of data stored in said storing means to a terminal via an established connection over said network.

24. The invention set forth in claim 23 wherein said interface circuit further comprises means for storing data received over said network either from said data processing system or from said communication processor, and wherein said data sending means includes means for sending data originally stored in said storing means or received data stored in said storing means.

25. The invention set forth in claim 24 wherein data originally stored in said storing means is stored in a ROM.

26. The invention set forth in claim 25 wherein received data stored in said storing means is stored in a RAM.

27. The invention set forth in claim 23 wherein data stored in said storing means includes compressed digitized speech messages.

28. The invention set forth in claim 27 wherein said interface circuit further comprises means interposed between said data storing means and said data sending means for decompressing said compressed digitized speech messages.

29. The invention set forth in claim 28 wherein said terminals are voice terminals.

30. The invention set forth in claim 23 further comprising means for accepting control signals from a connected terminal, and means for translating said control signals into messages for delivery to said data processing system over an established communication connection.

31. The invention set forth in claim 24 wherein said received data storing means includes means for buffering data received from either said data processing system or from said communication processor, a memory, a local processor, means controlled by said local processor for processing any information in said buffering means in accordance with instructions contained in said data and for transferring selected portions of said data to said memory.

* * * * *